(12) United States Patent
Kimura

(10) Patent No.: US 10,887,521 B2
(45) Date of Patent: Jan. 5, 2021

(54) IMAGING APPARATUS AND METHOD FOR CONTROLLING THE SAME

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 16/191,824

(22) Filed: Nov. 15, 2018

(65) Prior Publication Data

US 2019/0191089 A1 Jun. 20, 2019

(30) Foreign Application Priority Data

Dec. 20, 2017 (JP) ................. 2017-243927

(51) Int. Cl.
*H04N 5/232* (2006.01)
*G02B 7/10* (2006.01)
*H04N 5/374* (2011.01)
*H04N 5/225* (2006.01)
(Continued)

(52) U.S. Cl.
CPC .......... *H04N 5/23274* (2013.01); *G02B 7/10* (2013.01); *G02B 27/646* (2013.01); *H04N 5/2253* (2013.01); *H04N 5/2254* (2013.01); *H04N 5/232* (2013.01); *H04N 5/2351* (2013.01); *H04N 5/2353* (2013.01);
(Continued)

(58) Field of Classification Search
CPC ............... H04N 5/23274; H04N 5/232; H04N 5/23287; H04N 5/23258; H04N 5/2253; H04N 5/23241; H04N 5/2351; H04N 5/2254; H04N 5/374; H04N 5/2353; G02B 27/646; G02B 7/10
See application file for complete search history.

(56) References Cited

U.S. PATENT DOCUMENTS

| | | |
|---|---|---|
| 8,786,743 B2 | 7/2014 | Asukabe |
| 9,635,236 B2 | 4/2017 | Katsuyama et al. |
| 9,998,668 B2 | 6/2018 | Sakurai |

(Continued)

FOREIGN PATENT DOCUMENTS

| | | |
|---|---|---|
| JP | 2002-303909 A | 10/2002 |
| JP | 2005-175796 A | 6/2005 |

(Continued)

*Primary Examiner* — Gevell V Selby
(74) *Attorney, Agent, or Firm* — Venable LLP

(57) ABSTRACT

An imaging apparatus includes a shake detector and a shake correction unit. The shake correction unit performs image shake correction by moving an imaging element in a plane orthogonal to an optical axis of an imaging optical system. A shutter operation is performed using an electronic front curtain by the imaging element and a rear curtain of a shutter mechanism unit. A camera system controller performs driving control of the shake correction unit using a detection signal of the shake detector. If the camera system controller performs exposure control using the electronic front curtain and the rear curtain, the camera system controller performs regulation control for reducing the amount of rotation of the imaging element in a period before exposure during which the shake correction unit is active according to exposure conditions. Alternatively, the camera system controller performs control for luminance correction of a captured image according to exposure conditions.

17 Claims, 11 Drawing Sheets

(51) Int. Cl.
*H04N 5/235* (2006.01)
*G02B 27/64* (2006.01)

(52) U.S. Cl.
CPC ..... *H04N 5/23241* (2013.01); *H04N 5/23258* (2013.01); *H04N 5/23287* (2013.01); *H04N 5/374* (2013.01)

(56) References Cited

U.S. PATENT DOCUMENTS

| | | | |
|---|---|---|---|
| 2012/0147201 A1 | 6/2012 | Asukabe | |
| 2015/0256756 A1 | 9/2015 | Sakurai | |
| 2015/0264266 A1* | 9/2015 | Katsuyama | G02B 27/646 |
| | | | 348/208.2 |
| 2016/0028958 A1* | 1/2016 | Tsuchiya | G03B 5/00 |
| | | | 348/208.4 |
| 2017/0289476 A1* | 10/2017 | Kokubu | G03B 5/00 |
| 2018/0241926 A1* | 8/2018 | Nishimura | G02B 27/646 |

FOREIGN PATENT DOCUMENTS

| | | |
|---|---|---|
| JP | 2009-025686 A | 2/2009 |
| JP | 2012-129588 A | 7/2012 |
| JP | 2015-187712 A | 10/2015 |
| JP | 2015-188199 A | 10/2015 |

\* cited by examiner

IMAGING APPARATUS AND METHOD FOR CONTROLLING THE SAME

BACKGROUND OF THE INVENTION

Field of the Invention

The present invention relates to control for correcting image shake at the time of shooting.

Description of the Related Art

An imaging apparatus having an image shake correction function for correcting image shake of an image caused by camera shake or the like performs image shake correction, for example, in pitch and yaw directions. The pitch direction is the direction of rotation about an axis extending in the lateral direction of the imaging apparatus and the yaw direction is the direction of rotation about an axis extending in the longitudinal direction of the imaging apparatus. As the performance of image shake correction in the pitch and yaw directions has improved, the influence of shake in the roll direction has become unable to be ignored. There is a need to provide a mechanism capable of correcting image shake in the roll direction, that is, in the direction of rotation about the optical axis. On the other hand, a means for controlling the start of exposure by resetting electrical charge rather than performing exposure by opening a shutter curtain (hereinafter referred to as an electronic front curtain) has been proposed for an imaging apparatus having no quick return mirror mechanism.

An imaging apparatus disclosed in Japanese Patent Laid-Open No. 2012-129588 includes a shake correction unit using movement of an electronic front curtain and an imaging element. By adjusting the timing of the electronic front curtain in accordance with the amount of translational movement of the shake correction unit in the shutter running direction, it is possible to inhibit change in exposure due to parallel movement of the imaging element. An imaging apparatus disclosed in Japanese Patent Laid-Open No. 2015-188199 includes a shake correction unit using movement of an electronic front curtain and an imaging element and moves the shake correction unit to a specified position in response to an imaging instruction. This makes it possible to inhibit change in exposure due to parallel movement and rotational movement of the imaging element.

In the apparatuses disclosed in Japanese Patent Laid-Open Nos. 2012-129588 and 2015-188199, a change in exposure may occur depending on the situation of shooting, and a composition change or the like not intended by the user may also occur. The imaging apparatus disclosed in Japanese Patent Laid-Open No. 2012-129588 can inhibit change in exposure due to parallel movement, but cannot inhibit change in exposure due to rotational movement (roll driving). Further, in the imaging apparatus disclosed in Japanese Patent Laid-Open No. 2015-188199, a change in composition may occur and shooting may be performed with a composition different from that of the user's shooting intention since the imaging element is moved to a specified position in response to an imaging instruction.

SUMMARY OF THE INVENTION

An imaging apparatus according to an embodiment of the present invention including, an imaging element having a plurality of pixels that photoelectrically convert light from an imaging optical system and being configured to output an imaging signal; a driving unit including an actuator and configured to rotate the imaging element in a plane orthogonal to an optical axis of the imaging optical system; a shutter unit configured to run in a predetermined direction such that the shutter unit shields the imaging element from light; and at least one processor programmed to function as: a controller configured to control rotation of the imaging element by the driving unit on the basis of a result of detecting shake of the imaging apparatus, a scan unit configured to perform scanning to start charge accumulation of the imaging element; and an exposure control unit configured to start exposure through scanning of the scanning unit in response to input of a shooting instruction and to terminate the exposure by running the shutter unit, wherein the controller is configured to control an amount of rotational movement of the driving unit in a period before input of the shooting instruction on the basis of a degree of influence on exposure unevenness.

Further features of the present invention will become apparent from the following description of exemplary embodiments with reference to the attached drawings.

DESCRIPTION OF THE EMBODIMENTS

First Embodiment

Hereinafter, embodiments of the present invention will be described in detail with reference to the drawings.

Figure 1A:
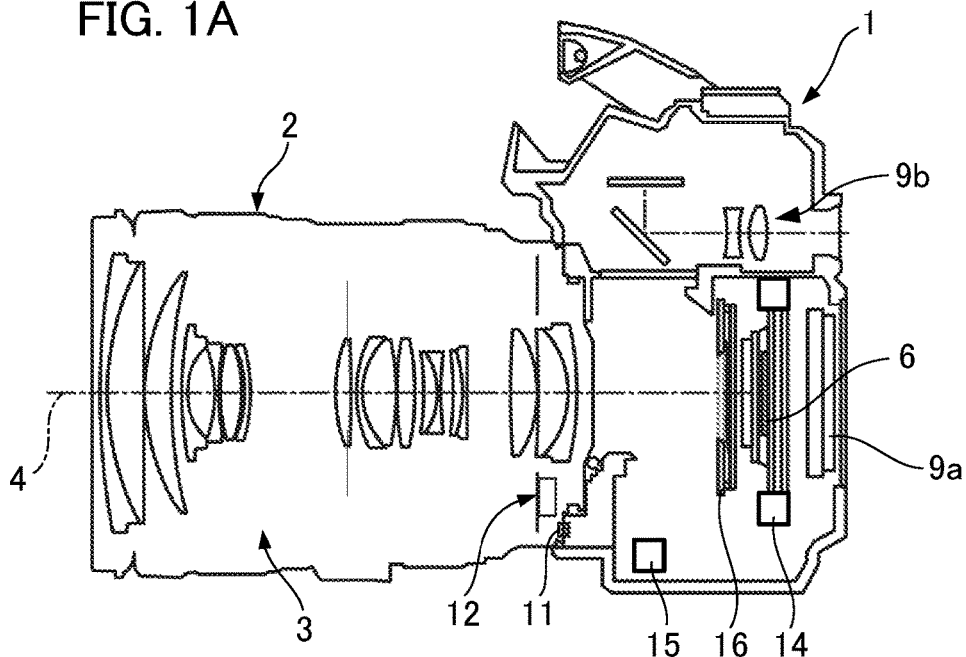
FIGS. 1A and 1B are diagrams showing an exemplary configuration of an imaging apparatus.
Figure 1B:
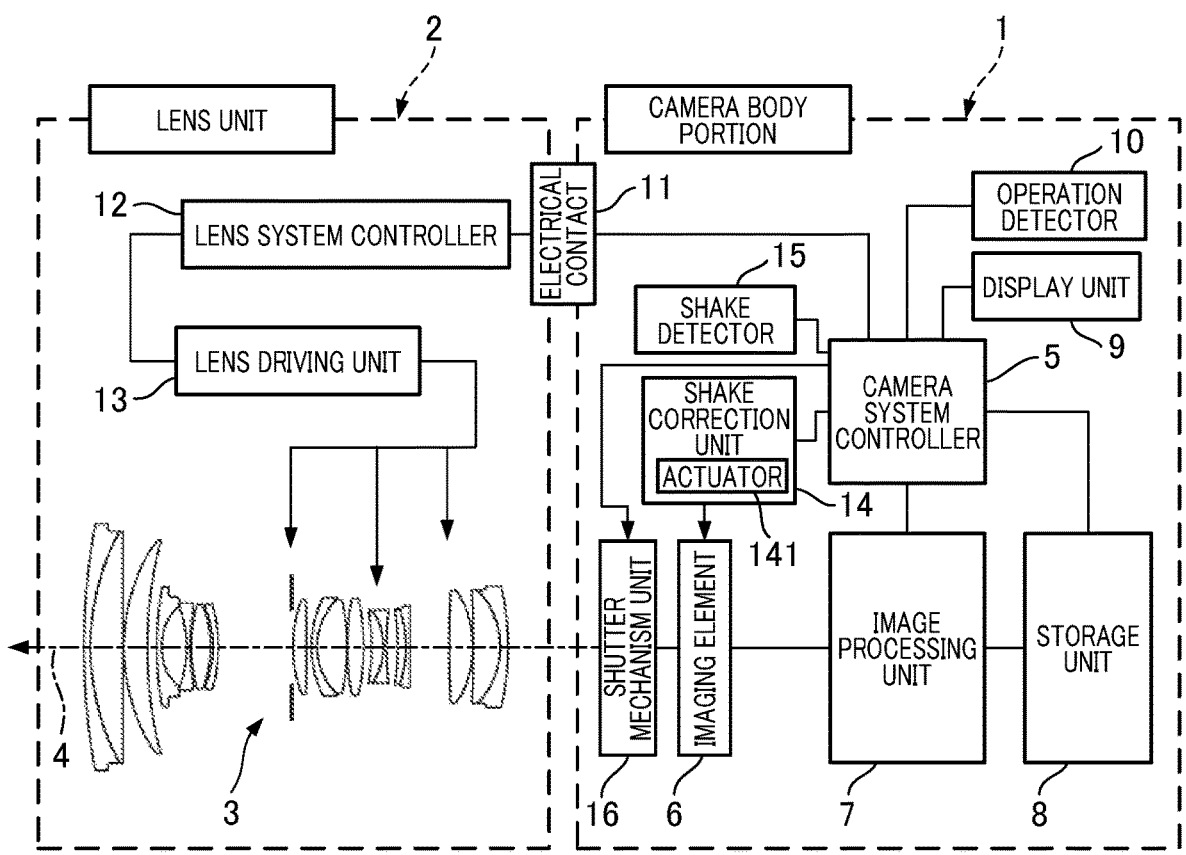

An imaging apparatus of the present embodiment will be described with reference to FIGS. 1A to 5. FIGS. 1A and 1B show an exemplary configuration of the imaging apparatus of the present embodiment. FIG. 1A is a central cross-sectional view schematically showing the imaging apparatus 1. An interchangeable lens type camera having a lens unit 2 mounted on an apparatus body portion thereof will be described as an example of the imaging apparatus 1.

The lens unit 2 includes an imaging optical system 3 including a plurality of lenses and a diaphragm. The optical axis of the imaging optical system 3 is shown as an optical axis 4. A lens system controller (hereinafter referred to as a lens controller) 12 can communicate with a controller in the apparatus body portion via an electrical contact 11.

The apparatus body portion of the imaging apparatus 1 includes an imaging element 6 and a display device 9a is provided on a rear face of the imaging apparatus. A user can observe a subject with an electronic viewfinder 9b. The apparatus body portion includes a shake correction unit 14 for correcting image shake of captured images and a shake detector 15 for detecting shake of the apparatus due to camera shake or the like. A shutter mechanism unit 16 is disposed on the subject side with respect to the imaging element 6 and is used to control the exposure time.

FIG. 1B is a block diagram showing main components of the imaging apparatus 1. The lens controller 12 performs driving control of a focus lens, an image shake correction lens, a diaphragm, or the like through a lens driving unit 13. The imaging element 6 receives light from the subject via the imaging optical system 3 and the shutter mechanism unit 16 and outputs an electrical signal through photoelectric conversion. The image processing unit 7 acquires an image signal output from the imaging element 6 and performs development processing or the like, and image data generated through the processing is stored in the storage unit 8.

The shake detector 15 detects rotational shake of the imaging apparatus in pitch, yaw, and roll directions. For example, shake detection is performed using a gyro sensor or the like and the shake detection signal is output to a camera system controller (hereinafter referred to as a camera controller) 5. The camera controller 5 performs overall control of the apparatus body portion of the imaging apparatus 1 and the lens unit 2 in accordance with an operation signal detected by the operation detector 10. The camera controller 5 includes a central processing unit (CPU) which executes a predetermined program to perform various processes for the camera system.

The shake correction unit 14 performs image shake correction in accordance with a control command from the camera controller 5. The shake correction unit 14 includes a mechanism unit that moves the imaging element 6 in a translational direction in a plane orthogonal to the optical axis 4 and rotates the imaging element 6 with the optical axis 4 as a central axis. The shake correction unit 14 includes at least one actuator. A specific structure will be described later.

Next, the operation of the imaging apparatus 1 will be described. Light from the subject forms an image on an imaging surface of the imaging element 6 via the imaging optical system 3. An evaluated amount of focusing or the amount of exposure is obtained from an output signal of the imaging element 6, and optical adjustment processing of the imaging optical system 3 is performed on the basis of this information. That is, the imaging element 6 is appropriately exposed to output an imaging signal corresponding to the subject image.

The shutter mechanism unit 16 performs light shielding control of the imaging element 6 by running a shutter curtain. The shutter mechanism unit 16 includes a light shielding member (a mechanical rear curtain) and performs completion of exposure of the imaging element 6. In the imaging element 6, a process for an electronic front curtain is performed prior to running of the rear curtain by the shutter mechanism unit 16. This is a process of controlling the timing of start of exposure (start of charge accumulation) by resetting a charge for each line. Scanning for the process of the electronic front curtain is the scanning which starts charge accumulation. In the mode of the electronic front curtain, exposure control is performed by synchronizing the reset operation of charge of the imaging element 6 and the movement of the rear curtain of the shutter mechanism unit 16. Since the technology of an electronic front curtain is well-known, more detailed description thereof will be omitted.

The image processing unit 7 includes an A/D converter, a white balance adjustment circuit, a gamma correction circuit, an interpolation calculation circuit, or the like. For example, the image processing unit 7 generates color image data from a Bayer array signal acquired from the imaging element 6 by performing color interpolation (demosaicing) processing and outputs image data for recording to the storage unit 8. The image processing unit 7 also compresses data such as still images, moving images, sound, or the like. The storage unit 8 stores various data including image data or the like. The camera controller 5 outputs data read from the storage unit 8 to the display unit 9 to perform a process for presenting the same to the user.

The camera controller 5 performs control for imaging processing, image processing, recording/reproducing processing, or the like in accordance with a user operation signal. For example, the operation detector 10 detects pressing of a shutter release button. A first switch is turned on through a half-press operation of the shutter release button, which is hereinafter referred to as an S1 operation. Further, a second switch is turned on when the user pushes the button all the way down through a fully-press operation of the shutter release button, which is hereinafter referred to as an S2 operation. Upon receiving a shooting instruction issued by the S2 operation from the operation detector 10, the camera controller 5 performs driving control of the imaging element 6, image processing, compression processing, or the like and further performs control for displaying image information or the like on the screen of the display unit 9. In addition, the operation detector 10 detects an operation performed on a touch panel provided on the display device 9a and transmits the operation instruction of the user to the camera controller 5.

The operation of the imaging optical system 3 will be described below. The camera controller 5 is connected to the image processing unit 7 and calculates an appropriate focus position and aperture value on the basis of a signal from the imaging element 6. That is, the camera controller 5 performs photometry and focus state detection on the basis of the output signal of the imaging element 6 and determines exposure conditions (such as an F value and a shutter speed). The camera controller 5 performs exposure control of the imaging element 6 through aperture control or shutter control. The camera controller 5 transmits a command signal to the lens controller 12 via the electrical contact 11. The lens controller 12 controls the lens driving unit 13 in accordance with a command signal from the camera controller 5. For example, in response to camera shake or the like, the lens driving unit 13 moves a correction lens (such as a shift lens) to perform an image shake correction operation.

When the user has instructed shooting of a still image or a moving image using an operation member of the imaging apparatus 1, the camera controller 5 performs control for a shooting operation in accordance with an operation signal from the operation detector 10. The camera controller 5 calculates a target value on the basis of a detection signal from the shake detector 15 and performs driving control of the shake correction unit 14. Here, the camera controller 5 performs a process of regulating the shake correction operation to reduce the amount of rotation of the imaging element 6 about the optical axis according to the shooting conditions, the exposure conditions, or the like. A specific example of the shake correction unit 14 will be described below with reference to FIG. 2. The shake correction unit 14 has a shake correction mechanism unit and a control circuit portion for the same.

Figure 2:
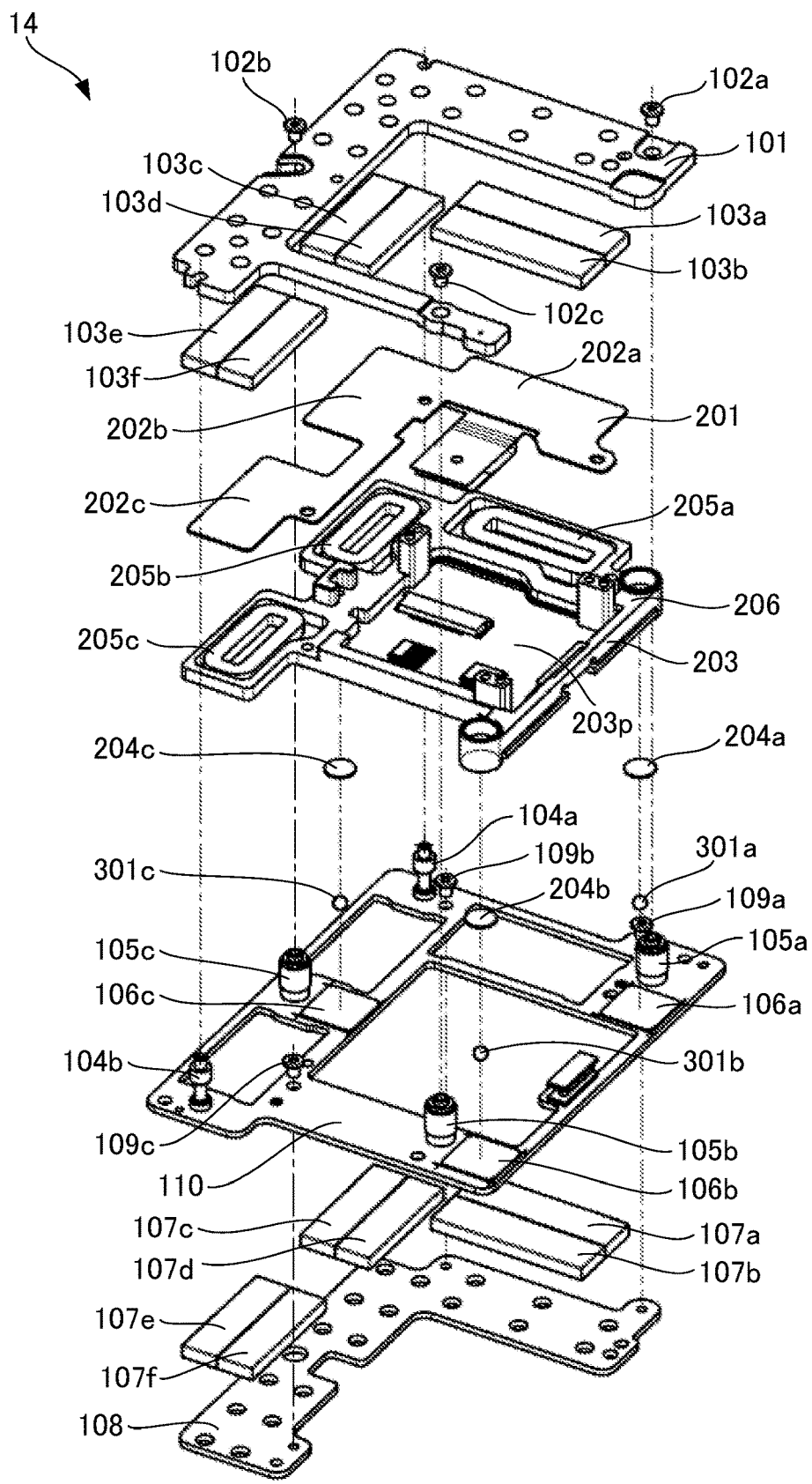
FIG. 2 is an exploded perspective view showing a shake correction unit.

FIG. 2 is an exploded perspective view of the shake correction mechanism unit. In FIG. 2, the vertical direction is defined as a direction parallel to the optical axis. The shake correction mechanism unit includes a fixed part and a movable part. Numbers in the 100s are assigned to fixed portions that do not move and numbers in the 200s are assigned to movable portions. Balls 301 (three balls in the present embodiment) held between the fixed part and the movable part are rolling members.

First, an upper yoke 101, a lower yoke 108, and a base plate 110 constituting the fixed part will be described. Upper magnets 103a, 103b, 103c, 103d, 103e, and 103f are attracted to and adhesively fixed to the upper yoke 101. The upper magnets 103a and 103b are adjacent to each other, the upper magnets 103c and 103d are adjacent to each other, and the upper magnets 103e and 103f are adjacent to each other. The upper yoke 101 is fastened and fixed to the base plate 110 using the screws 102a, 102b, and 102c.

Lower magnets 107a, 107b, 107c, 107d, 107e, and 107f are attracted to and adhesively fixed to the lower yoke 108. The lower magnets 107a and 107b are adjacent to each other, the lower magnets 107c and 107d are adjacent to each other, the lower magnets 107e and 107f are adjacent to each other.

The base plate 110 has a plurality of holes for avoiding the lower magnets 107a, 107b, 107c, 107d, 107e, and 107f such that surfaces of the magnets project through the respective holes. The base plate 110 and the lower yoke 108 are fastened and fixed to each other by screws 109a, 109b, and 109c. Since the dimensions of the lower magnets 107a to 107f in the thickness direction are larger than that of the base plate 110, the lower magnets 107a to 107f project through the holes of the base plate 110.

The upper yoke 101, the upper magnets 103a to 103f, the lower yoke 108, and the lower magnets 107a to 107f form a magnetic circuit, thus forming a so-called closed magnetic path. The upper magnets 103a to 103f and the lower magnets 107a to 107f are magnetized in the optical axis direction (the vertical direction in FIG. 2) and adjacent magnets (for example, the upper magnets 103a and 103b) are magnetized in different directions. An upper magnet and a lower magnet facing each other (for example, the upper magnet 103a and the lower magnet 107a) are magnetized in the same direction. By doing so, a high density of magnetic flux is generated in the optical axis direction between the upper yoke 101 and the lower yoke 108.

Since a strong attractive force is generated between the upper yoke 101 and the lower yoke 108, the base plate 110 is configured to maintain a suitable interval therebetween through main spacers 105a, 105b, and 105c and auxiliary spacers 104a and 104b provided on the base plate 110. The term "suitable interval" used here refers to the interval in which a flexible printed board (hereinafter referred to as an FPC) 201 and coils 205a to 205c which will be described later can be disposed and a suitable space can also be secured between the upper magnets 103a to 103f and the lower magnets 107a to 107f. The main spacers 105a, 105b, and 105c have screw holes. The upper yoke 101 is fixed to the main spacers 105a, 105b, and 105c through screws 102a, 102b, and 102c. Rubber is provided on the body of each main spacer to form a mechanical end portion (a so-called stopper) with respect to the movable part.

A movable frame 203 and the FPC 201 constitute the movable part. The movable frame 203 is disposed between the upper yoke 101 and the base plate 110. The movable frame 203 is formed by magnesium die casting or aluminum die casting and has light weight and high rigidity. The movable frame 203 has recesses formed to accommodate the coils 205a, 205b, and 205c. The movable frame 203 has a printed board 203p. The printed board 203p is electrically connected to the imaging element 6 (not shown), the coils 205a, 205b, and 205c, and position detection elements described below. The printed board 203p exchanges signals with an external circuit via a connector.

The position detection elements such as Hall elements are mounted on the FPC 201 which has attachment positions 202a, 202b, and 202c for the position detection elements. The position detection elements are attached to the attachment positions 202a, 202b, and 202c on the opposite surface of the FPC 201 which is not visible in FIG. 2.

Fixed part rolling plates 106a, 106b, and 106c are adhesively fixed to the base plate 110 and movable part rolling plates 204a, 204b, and 204c are adhesively fixed to the movable frame 203. The fixed part rolling plates 106a, 106b, and 106c and the movable part rolling plates 204a, 204b, and 204c face each other to form rolling surfaces for the balls 301a, 301b, and 301c, respectively. That is, the balls 301a to 301c are held between the fixed part rolling plates 106a to 106c and the movable part rolling plates 204a to 204c, respectively, such that the movable frame 203 is supported movably with respect to the base plate 110. Such additional provision of rolling plates makes it easy to design surface roughness, hardness, or the like in preferable states, compared to a method in which the balls 301a to 301c are interposed between the base plate 110 and the movable frame 203 without using the fixed part rolling plates and the movable part rolling plates.

In the shake correction mechanism unit configured as described above, the movable part can be moved by applying current to the coils 205a to 205c to generate a force according to Fleming's left-hand rule. In the present embodiment, position detection of the movable part is performed using magnetic detection elements such that the position can be detected using the magnetic circuit described above. For example, since the Hall elements are small elements, they can be arranged such that they are nested inside windings of the coils 205a to 205c. Also, feedback control can be performed using signals of the Hall elements. It is possible to control the rotational motion of the movable part about the optical axis together with the translational motion thereof in the plane orthogonal to the optical axis on the basis of signal values of the Hall elements.

Briefly speaking, the control of rotating the shake correction mechanism unit about the optical axis is achieved by performing driving control such that signals of the Hall elements at the attachment positions 202b and 202c are in opposite phases while maintaining the signals of the Hall elements at the attachment position 202a such that they are constant. Thereby, it is possible to generate a rotational motion substantially about the optical axis. Details of the control method are well known and therefore further description will be omitted.

Figure 3B:
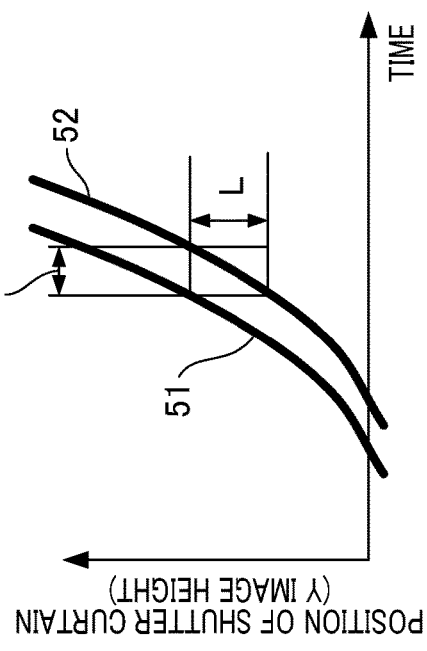
FIGS. 3A to 3D are diagrams illustrating the occurrence of exposure unevenness.
Figure 3D:
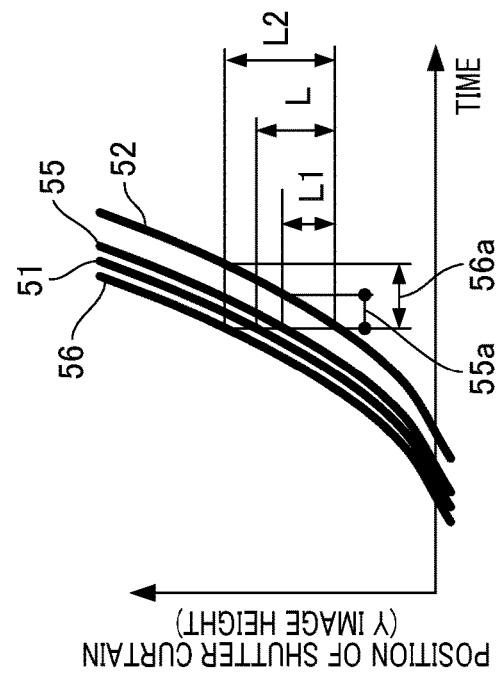
Figure 3A:
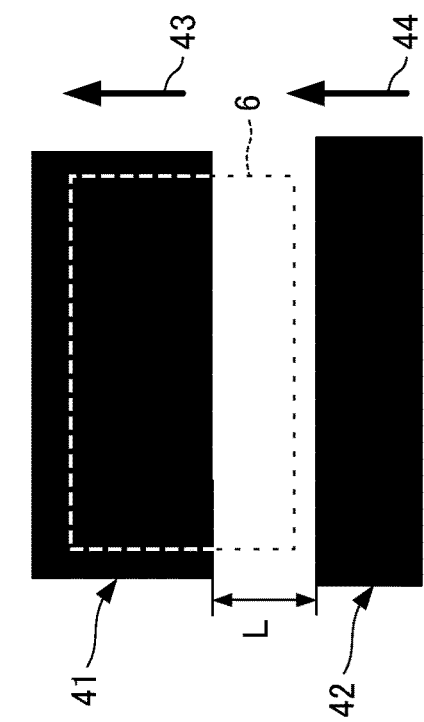
Figure 3C:
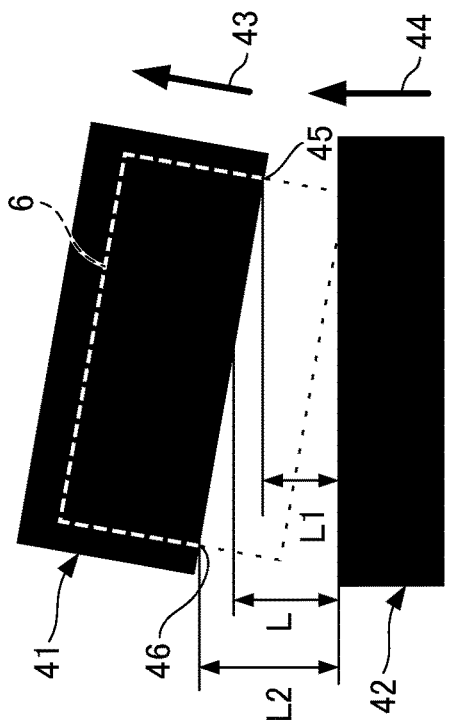

Exposure states when driving in the roll direction (referred to as roll driving) is performed and when roll driving is not performed during an exposure operation using the electronic front curtain and the mechanical rear curtain will now be described with reference to FIGS. 3A to 3D. FIGS. 3A and 3C are schematic views of the imaging element and the shutter members as viewed in the optical axis direction from the subject side. FIGS. 3B and 3D are graphs showing changes in position of the shutter curtain over time. The horizontal axis represents the time axis and the vertical axis represents the position of the shutter curtain, which corresponds to the image height in the vertical direction (Y direction). FIGS. 3A and 3B correspond to each other and show the case in which roll driving is not performed. FIGS. 3C and 3D correspond to each other and show the case in which roll driving is performed.

In FIGS. 3A and 3C, an electronic front curtain 41 and a mechanical rear curtain 42 which is a light shielding member are shown with respect to the imaging element 6. An arrow 43 indicates a running direction of the electronic front curtain 41 and an arrow 44 indicates a running direction of the mechanical rear curtain 42. In FIG. 3C, an end portion 45 is an end portion on the imaging element 6 at the right side (a right end portion) as viewed from the front and an end portion 46 is an end portion on the imaging element 6 at the left side (a left end portion) as viewed from the front.

In FIGS. 3B and 3D, a graph curve 51 indicates a running curve of the electronic front curtain 41 at the center of the screen and a graph curve 52 indicates a running curve of the mechanical rear curtain 42. A graph curve 55 indicates a running curve of the right end portion 45 of the electronic front curtain 41 and a graph curve 56 indicates a running curve of the left end portion 46 of the electronic front curtain 41. Time intervals 51a, 55a, and 56a indicate exposure times corresponding to the running curves 51, 55, and 56, respectively.

A symbol L commonly shown in FIGS. 3A and 3B and symbols L, L1, and L2 commonly shown in FIGS. 3C and 3D have the same meaning. That is, each indicates the interval (slit width) between the electronic front curtain and the mechanical rear curtain when observed at the same time.

L: Interval between the electronic front curtain 41 and the mechanical rear curtain 42
L1: Interval between the right end portion 45 of the electronic front curtain 41 and the mechanical rear curtain 42 (during roll driving)
L2: Interval between the left end portion 46 of the electronic front curtain 41 and the mechanical rear curtain 42 (during roll driving)

There is a relation that "L2>L>L1."

Although the electronic front curtain 41 is shown as a member having an area like a physical curtain in FIGS. 3A and 3C, in fact, the imaging element 6 is only reset in lines. That is, only a lower end portion of the electronic front curtain 41 shown is meaningful and other portions thereof always have charge stored therein rather than shielding light. FIGS. 3A and 3C only schematically show the exposure operation since it is difficult to illustrate lines and thus a way of drawing the electronic front curtain 41 such that it looks light shielding is employed to schematically provide easy understanding of the timing of start of exposure.

The running curve 51 of the electronic front curtain 41 is adjusted in the assembling process of the imaging apparatus such that the exposure time is constant. This is carried out such that the running curve 51 of the electronic front curtain 41 has a shape obtained by parallel movement of the running curve 52 of the mechanical rear curtain 42 in the time direction in FIG. 3B. Generally, the running curve has a complicated shape, but it is approximated by an appropriate polynomial or the like based on measurement results.

First, the case in which roll driving is not performed will be described. It can be seen from FIGS. 3A and 3B that the exposure time is constant even at different positions in a direction orthogonal to the running direction of the shutter (indicated by arrows 43 and 44), that is, in the horizontal direction in FIG. 3A. The exposure time is a duration indicated by the time interval 51a in FIG. 3B. It can be seen that the exposure time is constant from the fact that the interval between the electronic front curtain 41 and the mechanical rear curtain 42 is constant.

Next, the case in which roll driving is performed will be described. Resetting of the imaging element 6 is performed for each line due to wiring-related circumstances. That is, providing a reset line for each pixel is not practical since it makes wirings very complicated. As shown in FIG. 3C, the running direction of the electronic front curtain 41 rotates with the roll driving and becomes the direction indicated by the arrow 43. On the other hand, since the shutter mechanism unit 16 does not rotate with the roll driving, the running direction of the shutter mechanism unit 16 is the same as that of FIG. 3A, that is, the direction indicated by the arrow 44. As a result, the interval between the electronic front curtain 41 and the mechanical rear curtain 42 is different at different positions in the direction orthogonal to the running direction of the shutter. This causes exposure unevenness (a state in which the exposure varies in the imaging screen with the variation of the amount of exposure equal to or greater than a specified value). Specifically, in FIG. 3C, the interval between the electronic front curtain 41 and the mechanical rear curtain 42 is L at the central portion of the screen. The interval is L1 (<L) at the right end portion 45 and L2 (>L) at the left end portion 46. In FIG. 3D, the exposure time at the right end portion 45 is a duration indicated by the time interval 55a, which is shorter than the exposure time at the central portion of the screen, such that the right end portion 45 is underexposed. The exposure time at the left end portion 46 is a duration indicated by the time interval 56a, which is longer than the exposure time at the center portion of the screen, such that the left end portion 46 is overexposed.

In FIGS. 3A to 3D, roll driving for rotating the imaging element 6 in the counterclockwise direction has been described for the sake of convenience. If the imaging element 6 is rotated in the clockwise direction, the overexposed and underexposed states of the left and right sides are reversed. Also in this case, exposure unevenness occurs in the same way. That is, only the positions of the graph curves 55 and 56 are exchanged in FIG. 3D.

As the amount of rolling of the imaging element 6 during roll driving increases, the difference between L and L1 or L2 increases and the influence on exposure unevenness becomes more significant. This corresponds to the graph curves 55 and 56 being spaced further to the left and right with respect to the graph curve 51 in FIG. 3D. Even with the same amount of rolling, the influence on exposure unevenness becomes more significant as the shutter speed decreases. This corresponds to the case in which the graph curve indicating the running curve 52 of the mechanical rear curtain 42 gets closer to the graph curve 51 indicating the running curve of the electronic front curtain 41 in FIG. 3D. If the graph curves 51 and 52 get closer to each other, the influence increases when the graph curves 55 and 56 are separated from the graph curve 51 by the same amount. That is, although the difference in the amount of exposure is the same, the exposure unevenness becomes significant since the proportion of the amount of exposure changes greatly.

As described above with reference to FIGS. 3A to 3D, exposure unevenness occurs in the direction orthogonal to the shutter running direction due to roll driving only if the electronic front curtain is used. In the present embodiment, taking into consideration the above characteristics, the degree of influence on exposure unevenness is acquired and correction in the roll direction is restricted only if the influence becomes significant (that is, only if the degree of influence is greater than a threshold value).

Figure 4:
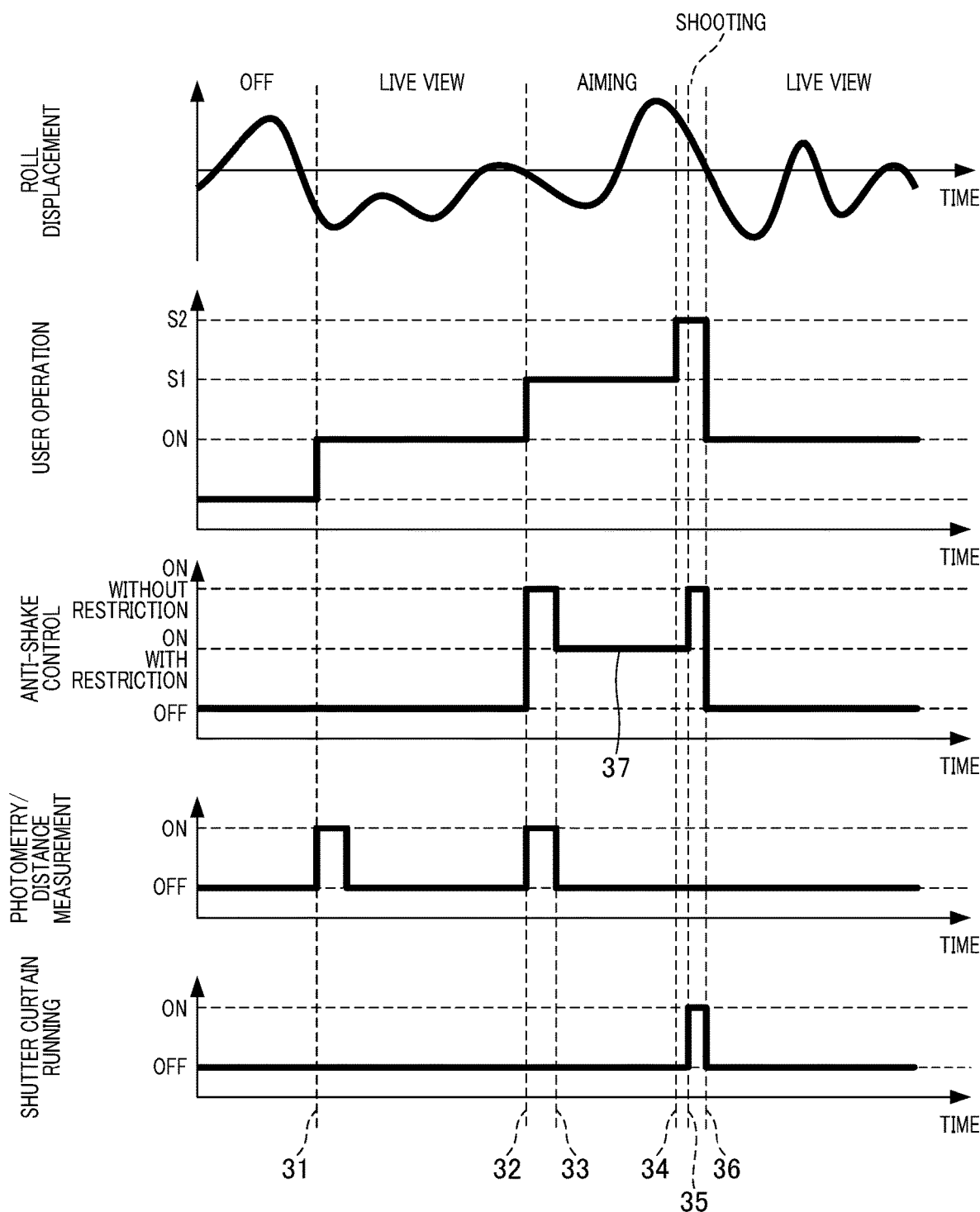
FIG. 4 is a diagram illustrating an operation sequence in a first embodiment.

A typical operation sequence according to the present embodiment will now be described with reference to FIG. 4. The horizontal axis in FIG. 4 is a common time axis. FIG. 4 is a timing chart showing roll displacement, user operation, anti-shake (image shake correction) control, photometry/distance measurement (focus state detection), and shutter curtain running in graphs in order from the top. In FIG. 4, time 31 indicates the timing of turning on the power, and time 32 indicates the timing of an S1 operation. Time 33 indicates the timing of completion of photometry and distance measurement and time 34 indicates the timing of an S2 operation. Time 35 indicates the start timing of the shutter curtain running and time 36 indicates the timing of completion of the shutter curtain running. A period 37 from the time 33 to the time 35 indicates a period during which the anti-shake control is restricted during aiming.

The vertical axis in the graph of roll displacement indicates the amount of shake in the roll direction. OFF indicates the OFF period of a power supply of the imaging apparatus and, after the power supply is turned on at the time 31, the state shifts to a live view period during which captured images are sequentially displayed. Thereafter, an S1 operation is performed at the time 32 and the holding state of the first switch (aiming) continues. An aiming period from the time 32 to the time 35 corresponds to a period during which the shake correction unit 14 is active before exposure. At the time 35, the exposure starts (shooting) and, after the end of the exposure, the state shifts again to the live view period.

In the graph of user operation, ON, S1, and S2 are shown. ON indicates that the power supply is turned on through a user operation, S1 indicates that the first switch is turned on through the S1 operation, and S2 indicates that the second switch is turned on through the S2 operation. In the example of FIG. 4, the ON state of the power supply is maintained after a power switch is operated at the time 31. At the time 32, a half-press operation of the shutter release button is performed and the ON state of S1 is maintained. Thereafter, at the time 34, a full-press operation of the shutter release button is performed such that the ON state of S2 is brought about and thereafter, at the time 36, the release operation is released and the ON state of the power supply is maintained.

In the graph of anti-shake control, OFF indicates that image shake correction control is not performed. "ON with restriction" indicates that image shake correction control is performed with restriction on correction in the roll direction. "ON without restriction" indicates that image shake correction control is performed without restriction on control in the roll direction. In the example of FIG. 4, the image shake correction control is OFF until the time 32 and starts after the S1 operation at time 32. The image shake correction control is in the "ON without restriction" state in a period from the time 32 to the time 33 and a period from the time 35 to the time 36. The image shake correction control is in the "ON with restriction" state in a period from the time 33 to the time 35.

In the graph of photometry/distance measurement, OFF indicates that a photometry operation and a distance measurement operation are not performed. ON indicates that the photometry operation and the distance measurement operation are performed. In the example of FIG. 4, the photometry operation and the distance measurement operation are performed after the power supply is turned on and processing for the live view operation is performed. After the S1 operation at the time 32 until the time 33, the photometry operation and the distance measurement operation are performed again and conditions for exposure are determined.

In the graph of shutter curtain running, ON indicates that the shutter curtain is running and OFF indicates that the shutter curtain is not running. In the example of FIG. 4, the shutter curtain runs during a period from the time 35 to the time 36.

When the power supply of the imaging apparatus 1 is turned on at time 31 in FIG. 4, a so-called live view operation is performed such that captured images acquired by the imaging element 6 are displayed on the display device 9a or the electronic viewfinder 9b and presented to the user.

When the S1 operation is performed by the user at time 32, the imaging apparatus 1 performs a photometric operation and a distance measurement operation. Thereafter, the camera controller 5 performs focus adjustment control and determines exposure conditions. That is, an aperture value, a shutter speed, an ISO sensitivity (an image amplification factor), or the like which are exposure conditions of the imaging apparatus 1 are determined. The camera controller 5 determines whether or not the shooting conditions satisfy predetermined conditions. The predetermined conditions are, for example, that an electronic front curtain be used, that the shutter speed be higher than a specified value, or the like. When the shooting conditions satisfy the predetermined conditions, the camera controller 5 restricts the roll driving during the S1 holding (aiming) during which the first switch is ON. In the example of FIG. 4, the roll driving is restricted in the period 37. A specific example of what kind of conditions restriction is performed in will be described later with reference to FIG. 5.

When the S2 operation is performed by the user at time 34, the electronic front curtain runs at the time 35 after a certain time lag and the mechanical rear curtain runs at the time 36. That is, the length of the period from the time 35 to the time 36 corresponds to the exposure time. Roll driving is not restricted during exposure (shooting). Thereafter, the live view operation is performed.

Figure 5:
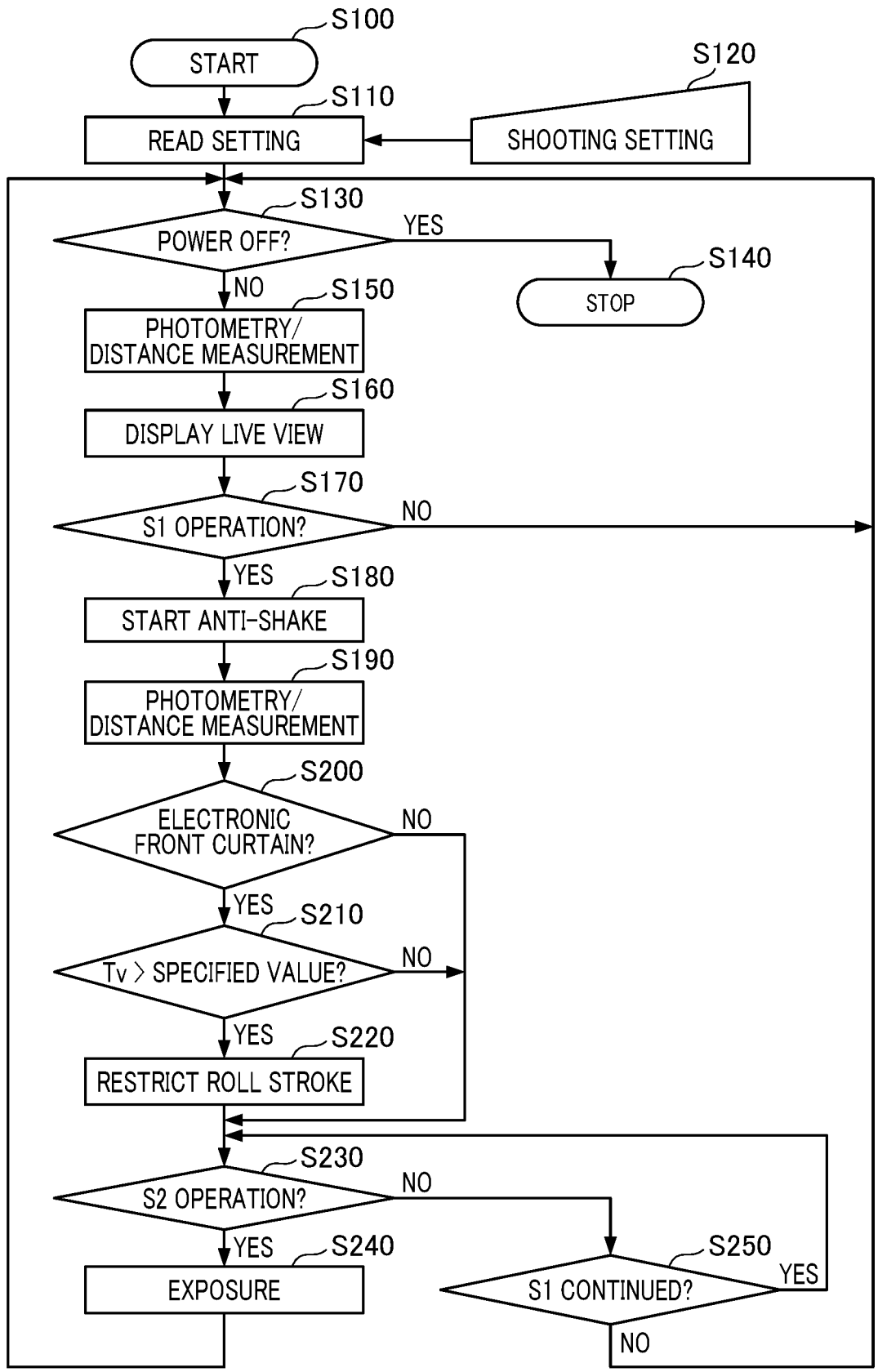
FIG. 5 is a flowchart illustrating an operation of the first embodiment.

FIG. 5 is a flowchart illustrating an exemplary operation of the present embodiment. This will be described step by step while comparing FIG. 5 and FIG. 4. The operation starts at step S100, which corresponds to power ON at the time 31 shown in FIG. 4. The processes of steps S100, S130, S170, and S230 corresponding to user operations are performed as interrupt processes, but the processes in the flowchart of FIG. 5 will be described for the sake of convenience.

In step S110, the camera controller 5 reads shooting setting information generated by a user operation. The shooting setting information S120 is information indicating whether or not the electronic front curtain is used or information on various setting values such as aperture priority/shutter priority. In step S130, the camera controller 5 determines whether or not the power supply is off. If it is determined that the power supply is off, the process shifts to step S140 and the operation is terminated. If it is determined that the power supply is on, the process proceeds to step S150.

In step S150, the camera controller 5 performs control for photometry and distance measurement. This corresponds to transition of photometry/distance measurement from OFF to ON after the time 31 in FIG. 4. As a result, exposure conditions or the like for capturing a live view image are determined. In step S160, the camera controller 5 performs a live view display process and the display device 9a or the electronic viewfinder 9b sequentially displays captured images. This corresponds to the period from the time 31 to the time 32 in FIG. 4.

In step S170, the camera controller 5 determines whether or not the S1 operation has been performed. If the S1 operation is performed, the process proceeds to step S180 and if the S1 operation is not performed, the process returns to step S130. In FIG. 4, in the period from the time 31 to the time 32, the process returns to step S130 through branch processing based on the condition determination and the process proceeds to step S180 at the time 32.

In step S180, the camera controller 5 starts anti-shake control. This corresponds to transition of anti-shake control from "OFF" to "ON without restriction" at the time 32 in FIG. 4. In step S190, photometry and distance measurement are performed. This corresponds to transition of photometry/distance measurement from OFF to ON at the time 32 in FIG. 4. For exposure control, the camera controller 5 determines an aperture value or a shutter speed (Tv value) according to the output signal of the imaging element 6.

In step S200, the camera controller 5 determines whether or not the electronic front curtain is used. The process of determining whether or not the electronic front curtain is used is performed by referring to information such as the setting values read in step S110. If it is determined that the electronic front curtain is used, the process proceeds to step S210 and if it is determined that the electronic front curtain is not used, the process proceeds to step S230.

In step S210, the camera controller 5 determines whether or not the Tv value is greater than a specified value, that is, whether or not the shutter speed is higher than a threshold value (that is, whether or not the exposure time is longer than a threshold value). If the Tv value is greater than the threshold value, the process proceeds to step S220 since it is estimated that the degree of influence on exposure unevenness is greater than the threshold value. On the other hand, if the Tv value is equal to or less than the threshold value, the process proceeds to step S230 since it is estimated that the degree of influence on exposure unevenness is equal to or less than the threshold value. The processes of step S200 and step S210 are not shown in FIG. 4 since they are determination processes performed by the camera controller 5.

In step S220, the camera controller 5 performs control for restricting stroke in the roll direction. As described above with reference to FIGS. 3A to 3D, exposure unevenness is great when the Tv value is large if the electronic front curtain is used. Therefore, the camera controller 5 restricts the stroke of roll driving by referring to a reference table prepared in advance such that the exposure unevenness in the screen is equal to or less than the specified value. That is, the camera controller 5 restricts the stroke in the roll direction such that the stroke in the roll direction decreases as the Tv value increases. Information of the imaging optical system 3 read as the shooting setting information S120 may also be reflected in the control. For example, the intensity of light at a position where the image height is great differs depending on the conditions for control of the imaging optical system 3 and zoom or focus control thereof. That is, exposure unevenness tends to be significant under shooting conditions in which the intensity of light at a position where the image height is great is originally small.

Therefore, the camera controller 5 performs setting such that the restriction of roll driving increases as the intensity of peripheral light of the lens unit 2 decreases. That is, a regulation value for the amount of rotation when the movable part of the shake correction mechanism unit rotates about the optical axis is determined according to the light intensity information of the imaging optical system 3. The restricting operation of step S220 corresponds to the anti-shake control being "ON with restriction" in the period from the time 33 to the time 34 in FIG. 4. The camera controller 5 determines the regulation value and performs a process of restricting the stroke in the roll direction of the shake correction unit 14.

In steps S200 to S220, if the exposure control is performed through the electronic front curtain and the rear curtain of the shutter mechanism unit 16, a restricting operation is performed during the period before exposure in which the shake correction unit 14 is active according to the shooting conditions. The camera controller 5 functions as a shake correction regulator that regulates the shake correction unit 14 so as to reduce the amount of rotation about the optical axis.

In step S230, the camera controller 5 determines whether or not the S2 operation has been performed. If the S2 operation is performed, the process proceeds to step S240 and if the S2 operation is not performed, the process proceeds to step S250. In FIG. 4, in the period from the time 33 to the time 34, the process proceeds to step S250 through branch processing based on the condition determination and the process proceeds to step S240 at the time 34.

In step S240, the exposure operation is performed and the camera controller 5 performs a process for running the electronic front curtain and the mechanical rear curtain and acquiring captured image data through the imaging element 6. In FIG. 4, in the period from the time 35 to the time 36, exposure is performed and captured image data is acquired. After step S240, the process returns to step S130.

In step S250, the camera controller 5 determines whether or not the S1 operation is continued. If the S1 operation is continued, the process returns to step S230 and if the S1 operation is not continued, the process returns to step S130. In FIG. 4, the operation advances to the S2 operation while maintaining the S1 operation. That is, the S1 operation is continued in the period from the time 33 to the time 34 and the process returns to the step S230 through branch processing based on the condition determination. Although not shown in FIGS. 5 and 4, the anti-shake control is set to OFF when a certain period of time has elapsed after the S1 operation is released.

In the present embodiment, the stroke in the roll direction is restricted when the electronic front curtain is used and the Tv value is greater than the threshold value. The restricted direction is only the roll direction, and there is no restriction and image shake correction control is performed as usual in the pitch and yaw directions. It is possible to inhibit frame-out of the subject image in the aiming period (the period from the time 32 to the time 35 in FIG. 4). That is, the merit of ease of aiming is maintained.

Modification of First Embodiment

Figure 6:
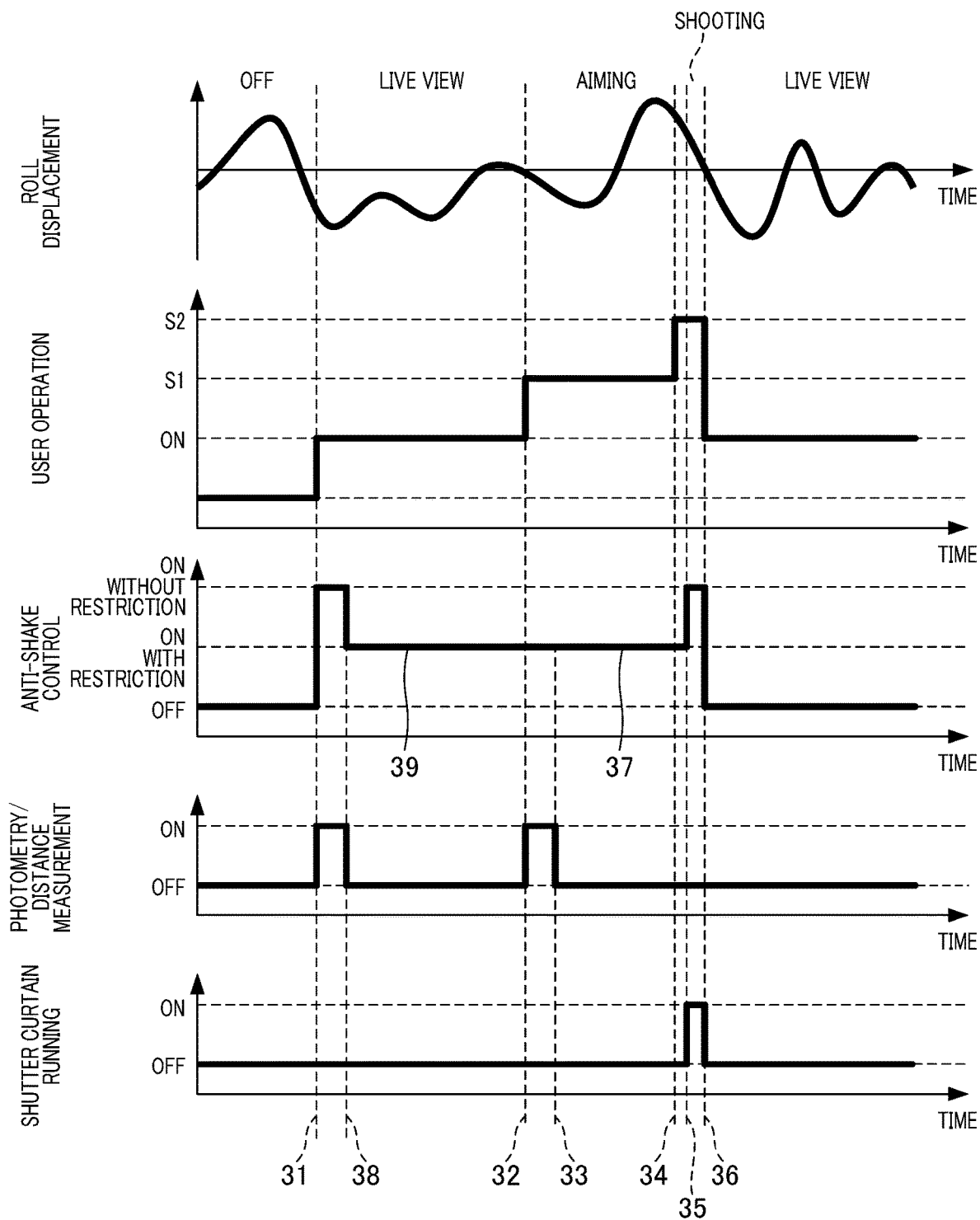
FIG. 6 is a diagram illustrating an operation sequence of a modification of the first embodiment.
Figure 7:
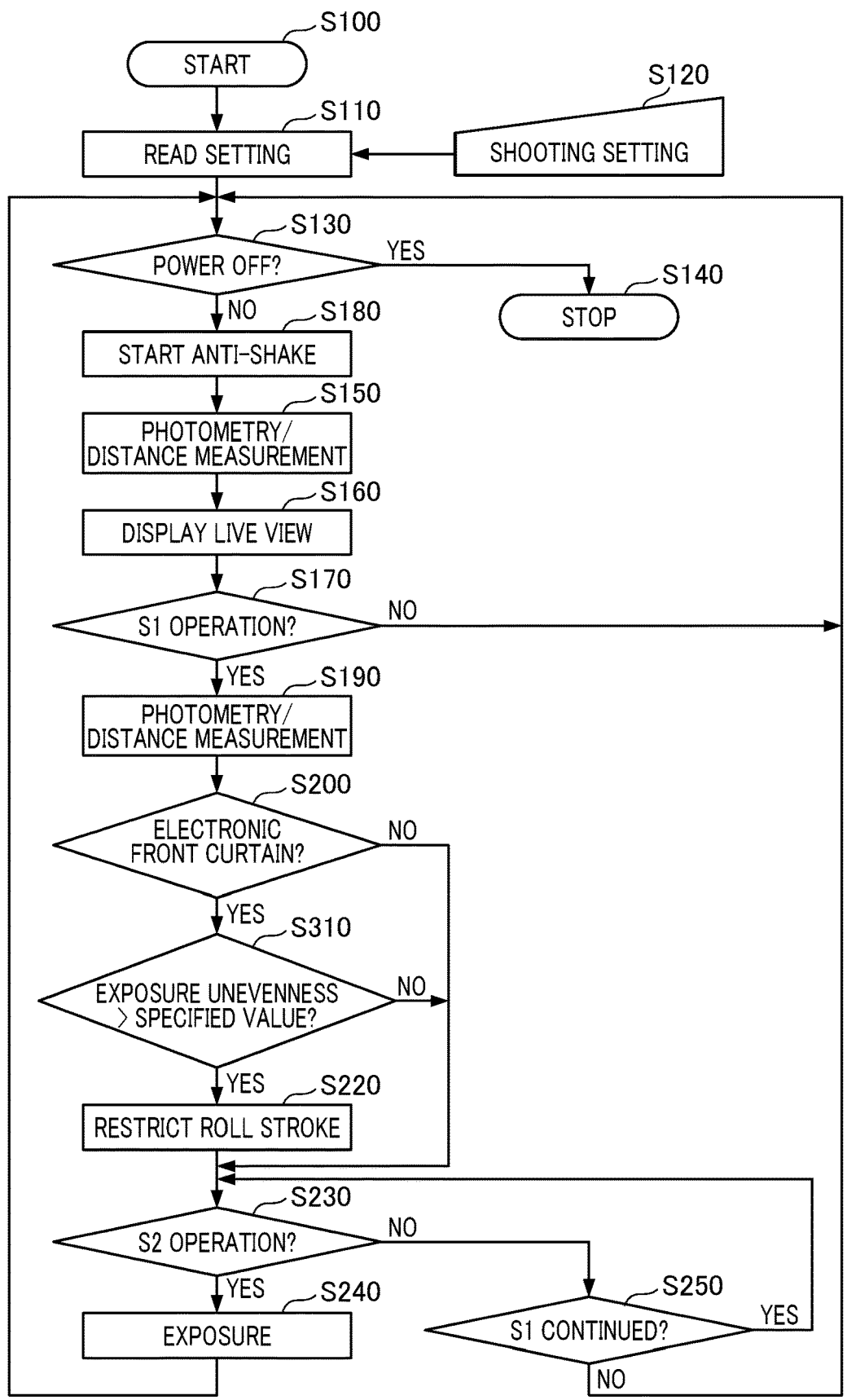
FIG. 7 is a flowchart illustrating the operation of the modification of the first embodiment.

A modification of the first embodiment will now be described with reference to FIGS. 6 and 7. FIG. 6 is a diagram corresponding to FIG. 4 and FIG. 7 is a diagram corresponding to FIG. 5. Hereinafter, differences from portions described in the first embodiment will be mainly described, and similar portions will be referred to by the reference numerals and symbols already used and the detailed description thereof will be omitted. Similar omission of description is applied to the following embodiments.

An operation sequence of the modification will now be described with reference to FIG. 6. In the example of FIG. 6, anti-shake control starts in response to power ON rather than at the timing of the S1 operation. By doing this, it is possible to reduce the influence of shake on the live view image. A period 39 indicates a period in which roll driving is restricted during the live view operation.

FIG. 7 is a flowchart corresponding to FIG. 6. Differences from FIG. 5 are as follows, and steps S180 and S310 will be described here.

Step S180 is moved between steps S130 and S150.

Condition determination process of step S310 is added after step S200.

In step S130, it is determined that the power supply is on and, in step S180, anti-shake control starts. Thus, the anti-shake control is performed even in periods in which the S1 operation has not been performed after the power supply is turned on (the period from the time 31 to the time 38 and the period 39). In FIG. 6, this corresponds to transition of anti-shake control from "OFF" to "ON without restriction" from the time 31 to the time 38.

In FIG. 5, after step S200, a condition determination process is performed to determine whether or not the Tv value is greater than a specified value as a condition for restricting the stroke in the roll direction in step S210. In the modification, the condition determination process of step S310 is performed as another condition determination process. In step S310, the camera controller 5 determines whether or not the exposure unevenness is greater than a specified value. If the exposure unevenness is greater than the specified value, the process proceeds to step S220 and the stroke in the roll direction is restricted. If the exposure unevenness is equal to or less than the specified value, the process proceeds to step S230. For example, the specified value is a first threshold EV value, and if the exposure unevenness in the screen exceeds the first threshold EV value, the process proceeds to step S220 to perform stroke restriction. To determine the first threshold EV value, the camera controller 5 refers to the light intensity information of the imaging optical system 3. For example, the intensity of light at a position where the image height is great differs depending on the conditions for control of the imaging optical system 3 and zoom or focus control thereof. In shooting conditions in which the intensity of light at the position where the image height is great is originally small, the exposure unevenness tends to be significant and therefore the camera controller 5 changes the specified value for the exposure unevenness to a second threshold EV value smaller than the first threshold EV value. The camera controller 5 determines a threshold value as to whether or not to restrict the amount of rotation about the optical axis according to the light intensity information of the imaging optical system or the shooting conditions. In steps S200, S310, and S220, the camera controller 5 functions as a shake control regulator. In the modification, a regulation value for restricting the rotation of the imaging element or a threshold value as to whether or not to perform control for regulating the rotation of the imaging element is determined on the basis of the light intensity information of the imaging optical system, the exposure conditions, or the like.

The following are comparisons of the present embodiment with the methods of Japanese Patent Laid-Open Nos. 2012-129588 and 2015-188199. First, the method of Japanese Patent Laid-Open No. 2012-129588 can cope with changes in exposure occurring when parallel movement is performed in the shutter running direction, but cannot cope with changes in exposure due to the rotation of the imaging element as in the present embodiment. However, since the method of Japanese Patent Laid-Open No. 2012-129588 and the method of the present embodiment are not exclusive to each other, execution of both methods at the same time can further inhibit change in exposure due to parallel movement and rotation.

Further, the method of Japanese Patent Laid-Open No. 2015-188199 corresponds to moving the imaging element to a specified position between the time 34 and the time 35 in FIG. 4 or FIG. 6. In this case, a change in the angle of view occurs at the time of aiming, but no change in the angle of view occurs in the present embodiment. According to the present embodiment, it is possible to reduce exposure unevenness while inhibiting change in the angle of view after the S2 operation.

Second Embodiment

A second embodiment of the present invention will now be described with reference to FIGS. 8 to 11. The present embodiment will be described with regard to second control for performing luminance correction of an image captured by the imaging element, in addition to first control for restricting image shake correction described in the first embodiment. That is, examples of control include an example in which the first control or the second control is selectively performed and an example in which both the first control and the second control is performed. In the present embodiment, a detailed description of components similar to those of the first embodiment will be omitted. An imaging apparatus according to the present embodiment is characterized by image processing and the image processing unit 7 in FIG. 1B performs luminance correction.

Figure 8:
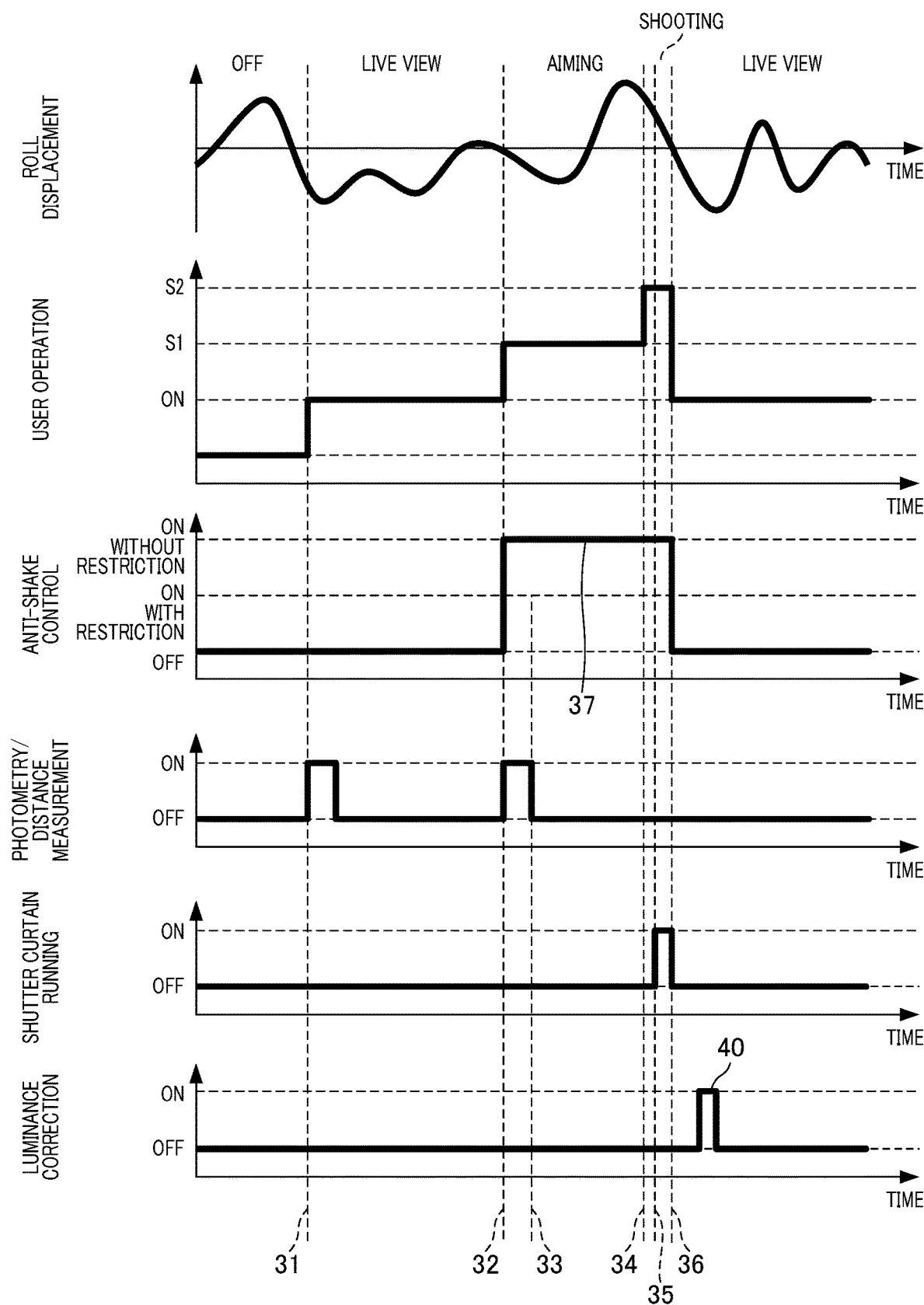
FIG. 8 is a diagram illustrating an operation sequence of a second embodiment.
Figure 9:
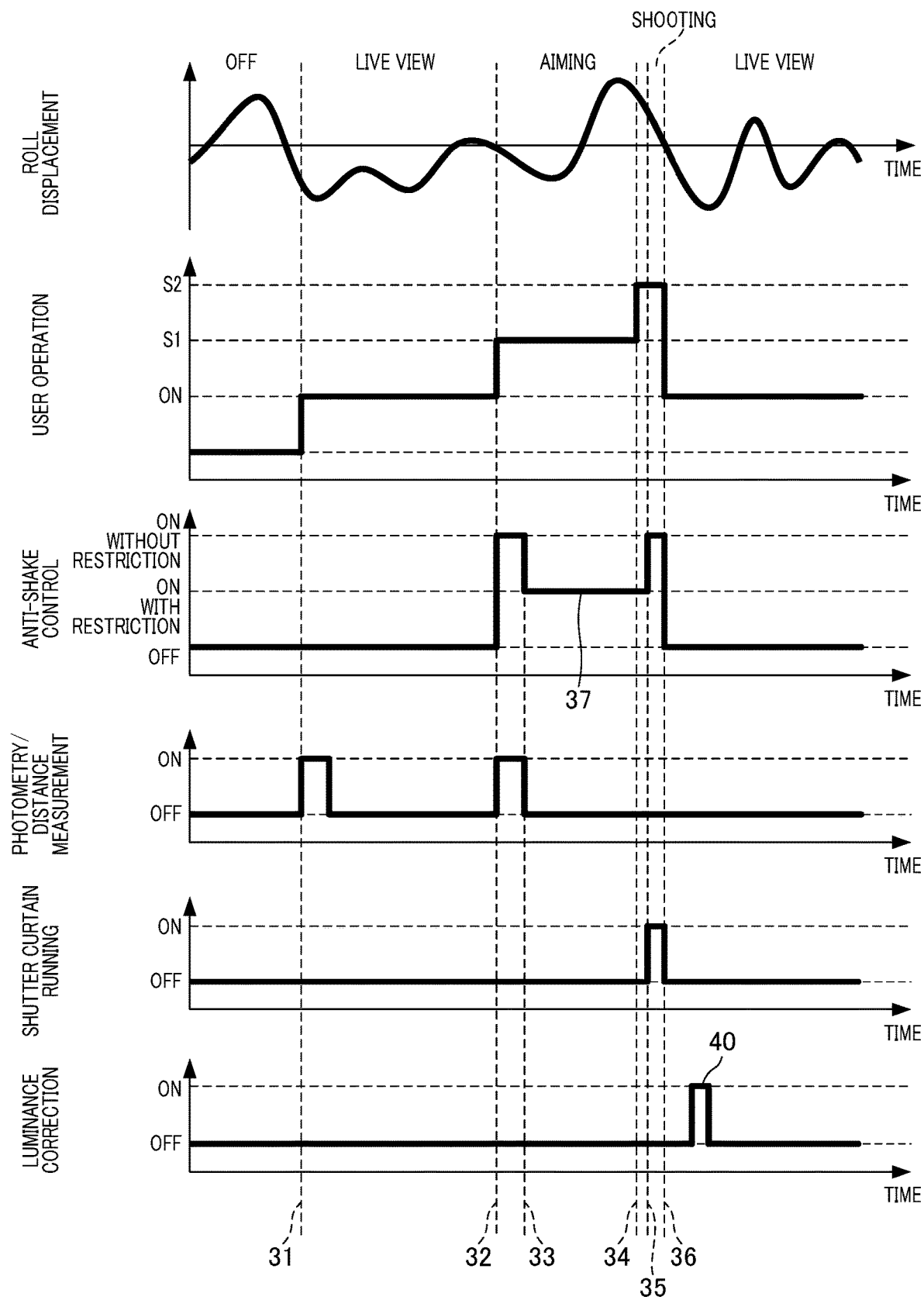
FIG. 9 is a diagram illustrating another example of the operation sequence of the second embodiment.

FIGS. 8 and 9 are diagrams which are written by the same notation as FIG. 4 and to which luminance correction is added as compared with FIG. 4. In FIGS. 8 and 9, luminance correction is performed in the period 40 after time 36, but the luminance correction is performed as necessary rather than always being performed as will be described later. The luminance correction is performed appropriately according to exposure conditions. FIG. 8 shows an example in which restriction of the anti-shake control is not performed in a period 37. On the other hand, FIG. 9 shows an example in which restriction of the anti-shake control is performed in a period 37.

Figure 10:
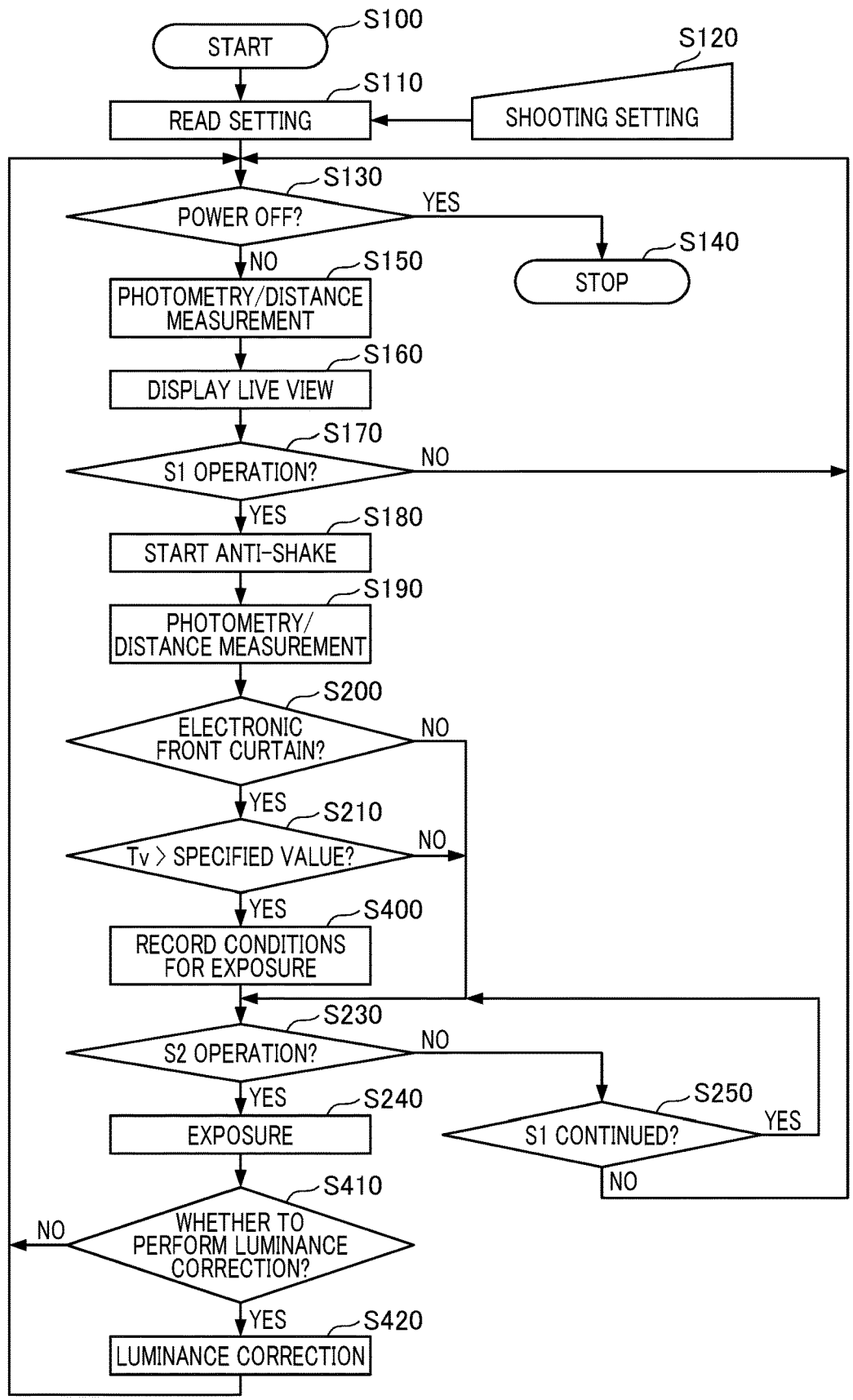
FIG. 10 is a flowchart illustrating an operation of the second embodiment.
Figure 11:
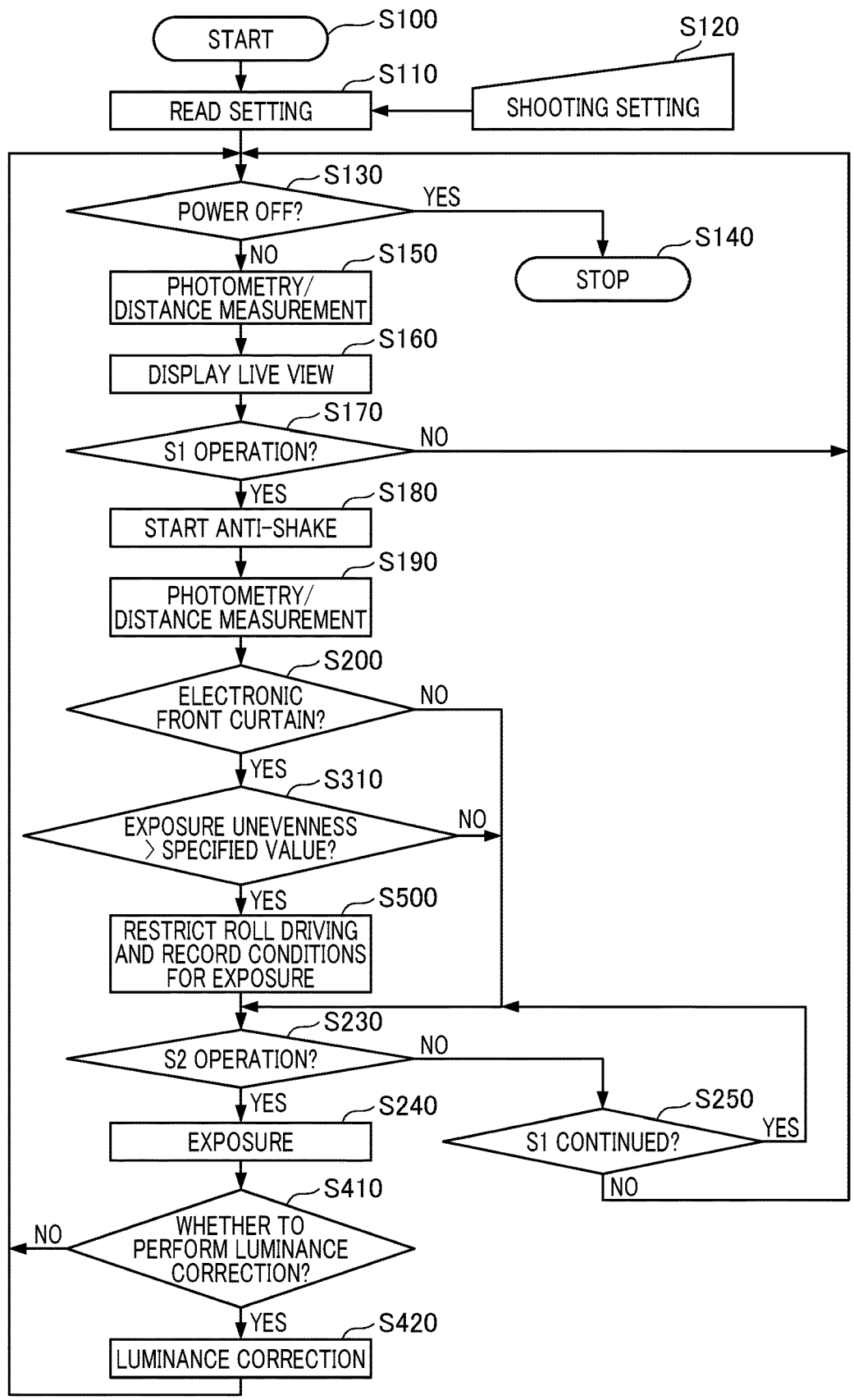
FIG. 11 is a flowchart illustrating another example of the operation of the second embodiment.

FIGS. 10 and 11 are flowcharts illustrating an example of the operation of the present embodiment. FIG. 10 shows a process corresponding to FIG. 8 in which luminance correction is performed if the shutter speed is higher than a threshold value. FIG. 11 shows a process corresponding to FIG. 9 in which luminance correction is performed if the exposure unevenness is greater than a threshold value.

In the example of FIG. 10, the processes of steps S400, S410, and S420 are different from those of FIG. 5.

The process of step S400 is performed instead of that of step S220.

After step S240, the process proceeds to step S410 and the process of step S420 is performed in accordance with the condition determination result of step S410.

In step S400, the camera controller 5 records information indicating the conditions for exposure in a memory. In this example, no restriction of roll driving is imposed in a period during which the shake correction unit 14 is active before exposure. This corresponds to "ON without restriction" in the period 37 of FIG. 8. In step S410, the camera controller 5 determines whether or not to perform luminance correction of the captured image. If it is determined that the luminance correction is to be performed, the process proceeds to step S420 and the image processing unit 7 performs a luminance correction process. This corresponds to the luminance correction being ON during the period 40 of FIG. 8. On the other hand, if it is determined that the luminance correction is not to be performed, the process returns to step S130 and the process is continued.

In FIG. 11, step S210 in FIG. 10 has been replaced with step S310. That is, in FIG. 10, the luminance correction is performed if it is determined that the shutter speed is greater than the threshold value through the condition determination process of step S210, whereas in FIG. 11, a determination process is performed as to whether or not the exposure unevenness is greater than a specified value in step S310. If the exposure unevenness is greater than the specified value, the process proceeds to step S500, and if the exposure unevenness is equal to or less than the specified value, the process shifts to step S230. If it is determined that the exposure unevenness is greater than the specified value, roll driving is restricted and information indicating the conditions for exposure is recorded in the memory in step S500. Execution of the luminance correction if it is determined that the exposure unevenness is greater than the specified value corresponds to the luminance correction being ON during the period 40 in FIG. 9.

Each of the processes of step S400 (recording of the conditions for exposure in step S500), step S410, and step S420 common to FIGS. 10 and 11 will be described below in detail. In step S400, a process of recording information indicating the conditions immediately before exposure is performed during the period of the S1 operation, i.e., during the period before exposure in which the shake correction unit 14 is active. The conditions recorded in step S400 are used in step S420. This will be described below in detail with reference to FIGS. 3C and 3D.

In FIG. 3C, the interval between the electronic front curtain 41 and the mechanical rear curtain 42 is L at the center portion of the image, whereas the interval is L1 (<L) at the right end portion 45 and L2 (>L) at the left end portion 46. Referring to FIG. 3D, the time interval 55a indicating the exposure time at the right end portion 45 is shorter than the exposure time at the central portion of the image, such that the right end portion 45 is underexposed. On the other hand, the time interval 56a indicating the exposure time at the left end portion 46 is longer than the exposure time at the central portion of the image, such that the left end portion 46 is overexposed. Factors contributing to this difference in exposure are shown below.

(a) Positions of pixels in the imaging element 6
(b) Slit width of exposure
(c) Amount of rotation about the optical axis of the movable part in the shake correction unit 14.

The positions of pixels in the imaging element 6 can be acquired by identifying the pixels when image correction is performed. The slit width of exposure is determined by the shutter speed and the characteristics of the shutter mounted on the imaging apparatus (how long it takes for the shutter to cover the entire opening). Therefore, the slit width of exposure can be acquired when the exposure conditions are determined through photometry in step S190. Further, the amount of rotation of the movable part about the optical axis in the shake correction unit 14 corresponds to the amount of driving in the roll direction and varies with time depending on the shake situation. Therefore, a process of recording the amount of rotation of the movable part of the shake correction unit 14 at each time point, together with the slit width of exposure, is performed in step S400.

Step S410 is a determination process as to whether or not to perform luminance correction. For example, a condition that the shutter speed is higher than a threshold value if the exposure unevenness is equal to or greater than a specified value is used as a criterion for the determination. By performing the luminance correction only when necessary in this manner, it is possible to inhibit adverse effects caused by overcorrection or the like.

The luminance correction of step S420 is performed on the basis of the information shown above in (a) to (c) described in step S400. Further, a process of correcting a reduction in the intensity of peripheral light of the imaging optical system 3 is performed on the basis of the light intensity information of the imaging optical system 3. That is, a process of correcting a reduction in the intensity of light occurring at a position where the image height is great is performed. Since these processes are similar, it is convenient to perform the processes simultaneously when adjusting the overall luminance balance of an output image. Furthermore, when the correction of a reduction in the intensity of peripheral light of the imaging optical system 3 and the correction of the light intensity unevenness based on the rotation about the optical axis of the movable part in the shake correction unit 14 are combined to perform the processing, the camera controller 5 defines an upper limit value for correction and performs luminance correction. If luminance correction is unlimitedly performed without defining an upper limit value for correction, the gain of luminance correction may sometimes become too high, expanding noise. In the present embodiment, it is possible to prevent such an adverse effect.

The luminance correction process of step S420 is performed by referring to a correction table corresponding to the information shown above in (a) to (c). The correction table is prepared as a lookup table created by performing calculation in advance on the influence shown in FIG. 3C. After the process of step S420, a process of recording the corrected image data on a recording medium is performed. In that case, although the gain (a value corresponding to the so-called ISO sensitivity) is not constant within the imaging screen, the camera controller 5 performs a process of recording a sensitivity value at the center of the screen (the central portion of the image) as a representative value on the recording medium in association with the captured image data.

The exposure conditions and upper and lower limits of the ISO sensitivity of the imaging apparatus will now be described. It is assumed that the ISO sensitivity has reached the upper limit of the imaging apparatus (high sensitivity). In this case, if the exposure conditions are determined with reference to the center of the screen in step S190, some locations in the screen become a condition of exceeding the upper limit value of the ISO sensitivity. In the example of FIG. 3C, the interval at the right end portion 45 is L1 (<L), causing an underexposed image. Correcting this expands noise since it is necessary to further increase the sensitivity amplification from the upper limit value of ISO. Therefore, if the imaging sensitivity of the imaging apparatus 1 for exposure is set to the upper limit value, the camera controller 5 that performs exposure control determines exposure conditions with reference to a position where the slit width is narrower. On the contrary, if the imaging sensitivity of the imaging apparatus 1 for exposure is set to the lower limit value, the camera controller 5 determines exposure conditions with reference to a position where the slit width is wider. If the ISO sensitivity is the lower limit value, it is convenient since there is no need to further lower the sensitivity. In the case in which exposure conditions are determined not for the center of the screen but for another position in consideration of the luminance correction, the camera controller 5 performs a process of recording information of the ISO sensitivity regarding the image as a value at the position for which exposure conditions have been determined in association with the image data. By doing this, for example, a portion with the highest sensitivity in the screen has an image quality at the upper limit value of the ISO sensitivity, and the upper limit value of the ISO sensitivity is recorded together with the image information on the recording medium.

According to the present embodiment, it is possible to reduce exposure unevenness while inhibiting change in the angle of view and to perform luminance correction on an image generated through an exposure operation, i.e., on a finally acquired image, as necessary.

In the above embodiments, in an imaging apparatus having an image shake correction function, it is possible to inhibit a reduction in the image quality of captured images through first control for regulating image shake correction or second control for performing luminance correction after imaging, or both the first control and the second control.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-243927, filed Dec. 20, 2017, which is hereby incorporated by reference herein in its entirety.

What is claimed is:

1. An imaging apparatus comprising:
   an imaging element having a plurality of pixels that photoelectrically convert light from an imaging optical system and being configured to output an imaging signal;
   a driving unit including an actuator and configured to rotate the imaging element in a plane orthogonal to an optical axis of the imaging optical system;
   a light shielding unit configured to run in a predetermined direction such that the light shielding unit shields the imaging element from light; and
   at least one processor programmed to function as:
   (1) a controller configured to control rotation of the imaging element by the driving unit on the basis of a result of detecting shake of the imaging apparatus;
   (2) a scan unit configured to perform scanning to start charge accumulation of the imaging element; and
   (3) an exposure control unit configured to start exposure through scanning of the scanning unit in response to input of a shooting instruction and to terminate the exposure by running the light shielding unit,
   wherein the controller is configured to control an amount of rotational movement of the driving unit in a period before input of the shooting instruction on the basis of a degree of influence on a variation of an exposure time in an imaging screen of the imaging element, and
   wherein the controller restricts the amount of rotational movement if the exposure time is shorter than a threshold value.

2. The imaging apparatus according to claim 1, further comprising an acquisition unit configured to acquire the degree of influence on the variation of the exposure time in the imaging screen of the imaging element.

3. The imaging apparatus according to claim 2, wherein the acquisition unit estimates the degree of influence on the variation of the exposure time in the imaging screen of the imaging element on the basis of the length of an exposure time.

4. The imaging apparatus according to claim 1, wherein the controller determines an upper limit value of the amount of rotational movement of the imaging element by the driving unit in a period before input of a shooting instruction on the basis of the degree of influence on the variation of the exposure time in the imaging screen of the imaging element and controls the amount of rotational movement on the basis of the determined upper limit value of the amount of rotational movement.

5. The imaging apparatus according to claim 4, wherein the controller determines the upper limit value of the amount of rotational movement such that the upper limit value of the amount of rotational movement when the degree of influence on the variation of the exposure time in the imaging screen of the imaging element is small is higher than when the degree of influence is great.

6. The imaging apparatus according to claim 4, wherein the controller controls the driving unit on the basis of the upper limit value and the result of detecting shake of the imaging apparatus.

7. The imaging apparatus according to claim 1, wherein the controller performs control for reducing the variation of the exposure time in the imaging screen of the imaging element by reducing the amount of rotational movement of the imaging element by the driving unit.

8. The imaging apparatus according to claim 1, wherein the controller controls the amount of rotational movement of the driving unit in a period after input of a shooting instruction on the basis of the degree of influence on the variation of the exposure time in the imaging screen of the imaging element.

9. The imaging apparatus according to claim 8, wherein the controller determines an upper limit value of the amount of rotational movement of the imaging element by the driving unit in a period after input of a shooting instruction on the basis of the degree of influence on the variation of the exposure time in the imaging screen of the imaging element and controls the amount of rotational movement on the basis of the determined upper limit value of the amount of rotational movement.

10. An imaging apparatus comprising:
an imaging element having a plurality of pixels that photoelectrically convert light from an imaging optical system and being configured to output an imaging signal;
a driving unit including an actuator and configured to rotate the imaging element in a plane orthogonal to an optical axis of the imaging optical system;
a light shielding unit configured to run in a predetermined direction such that the light shielding unit shields the imaging element from light; and
at least one processor programmed to function as:
(1) a controller configured to control rotation of the imaging element by the driving unit on the basis of a result of detecting shake of the imaging apparatus;
(2) a scan unit configured to perform the scanning which start charge accumulation of the imaging element;
(3) an exposure control unit configured to start exposure through scanning of the scanning unit in response to input of a shooting instruction and to terminate the exposure by running the light shielding unit;
(4) a correction unit configured to correct luminance of the imaging signal obtained by the light shielding unit running on the basis of an amount of rotation of the imaging element, an exposure time, and position information of pixels in the imaging element; and
(5) a recording unit configured to record the amount of rotation during exposure.

11. The imaging apparatus according to claim 10, wherein the recording unit records the amount of rotation at each of a plurality of timings during exposure.

12. The imaging apparatus according to claim 10, wherein the correction unit corrects a reduction in an amount of peripheral light of the imaging optical system through an image processing unit using light intensity information of the imaging optical system.

13. The imaging apparatus according to claim 10, wherein the correction unit determines an upper limit value used when performing correction of the luminance.

14. The imaging apparatus according to claim 10, wherein the controller performs control for recording a value of imaging sensitivity in association with a captured image data.

15. The imaging apparatus according to claim 10, further comprising a determination unit configured to determine an upper limit value of an amount of rotational movement of the imaging element by the driving unit in a period before input of a shooting instruction on the basis of a degree of influence on a variation of an exposure time in an imaging screen of the imaging element.

16. A method for controlling an imaging apparatus including an imaging element having a plurality of pixels that photoelectrically convert light from an imaging optical system and being configured to output an imaging signal, the method comprising:
rotating the imaging element in a plane orthogonal to an optical axis of the imaging optical system;
controlling rotation of the imaging element on the basis of a result of detecting shake of the imaging apparatus;
starting exposure by performing the scanning which start charge accumulation of the imaging element in response to input of a shooting instruction; and
terminating the exposure by running a light shielding unit in a predetermined direction such that the light shielding unit shields the imaging element from light,
wherein the controlling includes controlling an amount of rotational movement of the imaging element in a period before input of the shooting instruction on the basis of a degree of influence on a variation of an exposure time in an imaging screen of the imaging element, and
wherein the controlling the amount of rotational movement of the imaging element in a period before input of the shooting instruction on the basis of a degree of influence on a variation of an exposure time in an imaging screen of the imaging element includes restricting the amount of rotational movement if the exposure time is shorter than a threshold value.

17. A method for controlling an imaging apparatus including an imaging element having a plurality of pixels that photoelectrically convert light from an imaging optical system and being configured to output an imaging signal, the method comprising:
rotating the imaging element in a plane orthogonal to an optical axis of the imaging optical system;
controlling rotation of the imaging element on the basis of a result of detecting shake of the imaging apparatus;
starting exposure by performing the scanning which start charge accumulation of the imaging element in response to input of a shooting instruction;
recording an amount of rotation of the imaging element during exposure;
terminating the exposure by running a light shielding unit in a predetermined direction such that the light shielding unit shields the imaging element from light; and
correcting luminance of the imaging signal obtained by the light shielding unit running on the basis of the amount of rotation of the imaging element, an exposure time, and position information of pixels in the imaging element.

* * * * *